United States Patent [19]

Binder et al.

[11] 4,445,383
[45] May 1, 1984

[54] MULTIPLE RANGE CAPACITIVE PRESSURE TRANSDUCER

[75] Inventors: Paul B. Binder, North Wales; Louis D. Di Napoli, Colmar, both of Pa.

[73] Assignee: General Signal Corporation, Stamford, Conn.

[21] Appl. No.: 389,657

[22] Filed: Jun. 18, 1982

[51] Int. Cl.³ .............................................. G01L 9/12
[52] U.S. Cl. ..................................... 73/718; 361/283
[58] Field of Search .......................... 73/718; 361/283

[56] References Cited

U.S. PATENT DOCUMENTS

| | | | |
|---|---|---|---|
| 4,257,274 | 3/1981 | Shimada et al. | 73/718 |
| 4,261,086 | 4/1981 | Giachino et al. | 361/283 |
| 4,390,925 | 6/1983 | Freud | 73/718 |

*Primary Examiner*—Gerald Goldberg
*Assistant Examiner*—John E. Chapman, Jr.
*Attorney, Agent, or Firm*—William G. Miller, Jr.; Harold Huberfeld

[57] ABSTRACT

There is provided a multirange, variable capacitance pressure transducer by bonding a diaphragm plate that is conductive between a pair of insulating plates with the diaphragm plate having a plurality of cavities provided on each side so that diaphragm deflection areas of different sizes are defined. The surfaces of the pair of plates in the cavities are covered by a conductive coating so that the coatings form capacitors with the deflection areas. A fluid communication path is provided to each cavity so that the pressure difference to be measured is placed across the deflection area. Electrical connection is made to selective combinations of said capacitors to provide pressure transducers for a number of ranges in one unit.

8 Claims, 3 Drawing Figures

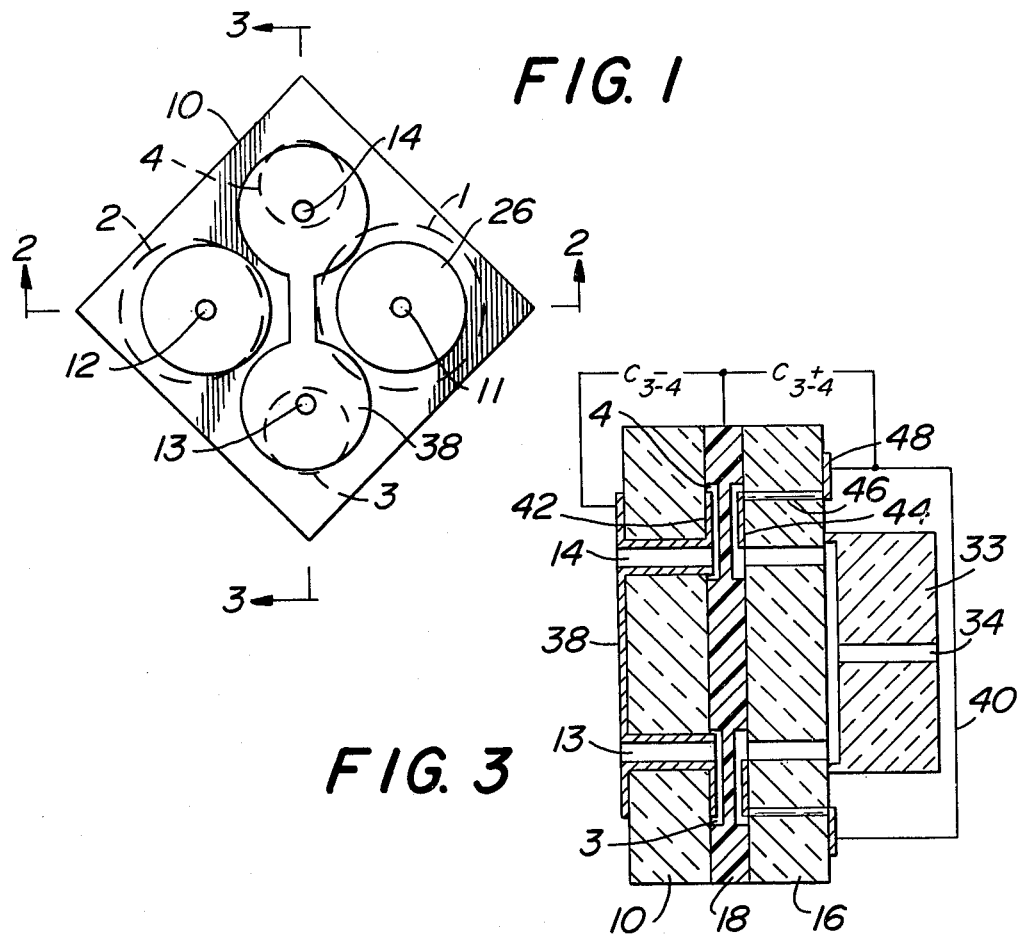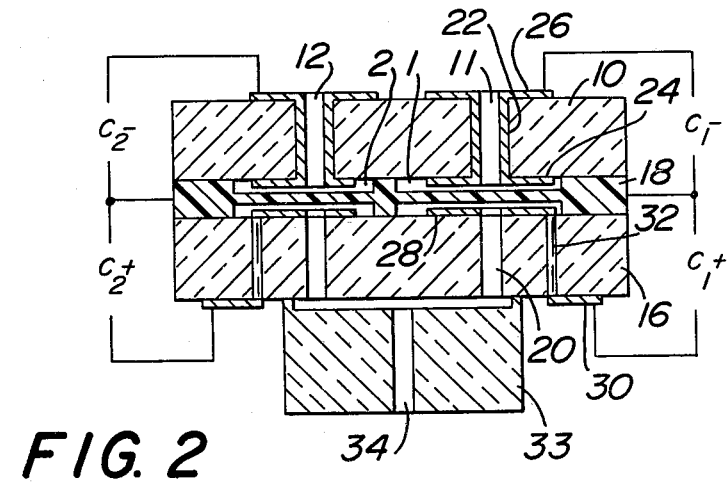

MULTIPLE RANGE CAPACITIVE PRESSURE TRANSDUCER

BACKGROUND OF THE INVENTION

This invention relates to a pressure transducer capable of handling a wider variety of pressure ranges than would normally be possible with a single diaphragm type without degradation of its specifications.

Pressure transducers such as those shown in U.S. Pat. No. 4,257,274-Shimada et al, issued on Mar. 24, 1981, have been developed to take advantage of the ease of manufacture and the favorable characteristics of silicon as a diaphragm material in combination with plates of borosilicate glass anaodically bonded to its faces. The etched recesses in the diaphragm faces form with the glass plates opposing cavities which are very accurately dimensioned by the etching process so as to provide a pressure transducer structure which is stable with temperature changes. This type of pressure transducer also has benefits based on the considerable simplicity of its construction which makes it very easy to mass produce and which makes possible a miniaturization without sacrifice of the necessary characteristics of a good transducer.

A method for producing pressure transducers of the type described in the above mentioned patent is shown in U.S. Pat. No. 4,261,086 issued to Giachino on Apr. 14, 1981. This method calls for the manufacture of a number of transducers from a single wafer of silicon which is sliced into individual transducers as a last step in the manufacturing process with the resulting convenience for using batch processing techniques.

Pressure transducers of the type described in the above patents all utilize a process called electrostatic bonding, sometimes referred to as anodic bonding, to attach two borosilicate glass sensing electrode support plates to opposite faces of a silicon disc into which are etched circular recesses. The diameter of the recesses defines the diameter of the diaphragm area while the depth of the recesses defines the capacitor plate spacing. The deflection of the diaphragm when a pressure is applied to one side is sensed by a capacitance increase on one side of the diaphragm and a capacitance decrease on the opposite side. The pressure range which can be measured by the device is determined by the deflections from a unit of pressure on the diaphragm which, in clamped diaphragm theory, is proportional to the diameter to the 4th power divided by the thickness to the 3rd power.

$$d \propto p(D^4/t^3)$$

where
D = diaphragm diameter
t = thickness
d = center point deflection
p = pressure difference In order to change the range for the pressure transducers produced in accordance with the above technique, changes are made by changing the diaphragm diameter "D" and the diaphragm thickness "t". For instance, if the diameter is halved, the range is increased by 16 times, and if the thickness is doubled, the range is increased by 8 times. Theoretically, assuming a maximum deflection for the diaphragm, any range can be obtained by an appropriate choice of thickness and diameter. In practice, however, this is not the case since there are limitations in the value for thickness and diameter which can be practically achieved for a diaphragm. Thus, there is an upper pressure limit in the practical sense for a single diaphragm as established by these values.

For a fixed diameter the range can be increased by increasing the thickness of the diaphragm. As the range increases, the forces acting on the cavity increase in proportion to the pressure times the cavity area. A pressure will be reached where these forces exceed the material strength even though a diaphragm thickness can be established for the proper deflection. In order to operate, the diameter of the cavity must be reduced instead of the diaphragm thickness being increased. The choice of dimensions will therefore be made first for strength of the device by specifying a diameter small enough to contain the pressure being measured. Second, a thickness of diaphragm is chosen to give the desired diaphragm deflection at the pressure being measured.

There is also a limitation in how small the diameter for the diaphragm can be made because as the diameter is decreased the capacitance of the unit is decreased as the square of the diameter. This becomes of significance when one considers that the electrical connections to the transducer always have some level of stray capacitance associated with them. Thus, as the diameter decreases and the device capacitance drops, the point is reached where the stray capacitance is too large compared with the device capacitance to make a linear measurement. A second problem arises from the use of small diameter diaphragms in that the measuring signal, which is typically an AC current, becomes too small because the impedance of the device is too high and the accuracy degrades because of signal to noise or temperature coefficient limitations.

It is, of course, desirable that the instrumentation to which the transducer is connected should be standardized. Thus, there is a need for the capacitance level and the capacitance change over the measuring range to be the same for all ranges. For this reason the diameter of the deposits forming the capacitor plate should all be the same and the capacitor gap should be the same. To this end the recesses in the diaphragm plate, normally produced by an etching process, should be the same depth for all cavities. That allows for ease of production and minimization of cost.

It is an object of this invention to provide a transducer structure which is useful for a number of different ranges while providing the same capacitance and the same capacitance change without degrading the accuracy of the transducer.

SUMMARY OF THE INVENTION

In accordance with this invention a multirange, variable capacitance pressure transducer is provided by bonding a diaphragm plate to another plate with the diaphragm plate having a plurality of deflecting areas defined by cavities provided so that diaphragm deflection areas of different sizes are defined. The surfaces of the plates in the cavities are have conductive areas so that capacitors are formed in the deflecting areas. A fluid communication path is provided to each cavity so that the pressure difference to be measured is placed across the deflecting area. Electrical connection is made to selective combinations of said capacitors to provide pressure transducers for a number of ranges in one unit.

DESCRIPTION OF THE DRAWINGS

In the figures where like elements have the same reference characters:

FIG. 1 is a top view of one form of the invention.

FIG. 2 is a front elevation showing two deflection areas.

FIG. 3 is a side elevation showing the remaining two deflection areas.

DESCRIPTION OF THE PREFERRED EMBODIMENT

In accordance with the invention one construction for a capacitive pressure transducer provides for electrostatically bonding a diaphragm plate of semiconductive material between two plates of inorganic electrically insulating dielectric material. The diaphragm plate has material removed from a plurality of areas to form a plurality of recesses which may differ in diameter as needed to obtain a number of different ranges. The dielectric plates have formed on their surfaces metallized areas which will correspond with the recesses. The cavities formed by the recesses in conjunction with the bonded plates are exposed to the pressure involved in the measurement to be made and the capacitor plates are electrically interconnected as necessary to form, in one unit, transducers capable of measuring a number of different ranges.

In FIG. 1 the top view of the transducer shows the rectangular plates, such as plate 10, and there is shown by dashed lines the deflecting area of the diaphragms. For example, the deflection areas 1 and 2 are shown having different diameters so that each will be useful for a different range of pressures. The deflective areas 3 and 4 are shown having smaller but similar diameters so that the areas 3 and 4 may be combined to provide a pressure transducer for higher pressures than would be suitable for areas 1 and 2, the combination being made by electrical connection.

In FIG. 1 the apertures 11, 12, 13, and 14 are shown as the means for providing for fluid communication to the deflecting areas of the diaphragms 1, 2, 3, and 4 respectively.

The transducer of the figures is shown in front elevation in FIG. 2 where there is shown a pair of plates of non-conductive material, namely plates 10 and 16. These plates may preferably be borosilicate glass.

A diaphragm plate 18 is shown sandwiched between the plates 10 and 16 and bonded thereto. The plate 18 may preferably be of single crystal silicon which is conductive to electricity. The bond between the plates 10 and 16 and the plate 18 may advantageously be provided by the electrostatic bonding process so that fluid-tight cavities are provided on both sides of each of the deflecting areas of the diaphragm plate 18. This cavity may advantageously be formed by etching recesses into the silicon diaphragm plate 18, thus defining the deflection areas of the diaphragm plate 18 which have the differing sizes shown in FIG. 1 to provide a multirange transducer.

As shown in FIG. 2, the cavities formed on each side of the deflecting area 1 are in fluid communication with the fluid pressures to be measured by the transducer by way of the apertures 11 and 20. The aperture 11 has its periphery plated with a conducting metal 22 to provide for an electrical connection between the conducting areas 24 and 26 deposited on plate 10. Similar conducting areas 28 and 30 are deposited on plate 16 to provide for the electrical connection by way of the sealed pin 32 between the exterior contact area 30 and the conductive area 28 which will act as one electrode of a variable capacitor. The electrode needed opposite the plate 28 is the deflecting area 1 of the silicon a. A similar capacitor is provided on the other side of the diaphragm between the conductive area 24 and the diaphragm deflecting area 1.

As shown in FIG. 2, the aperture 20 is manifolded with the other apertures on that side of the transducer by the glass element 33 so that all of the apertures on the lower side of the transducer are exposed to the fluid pressure introduced at aperture 34. This pressure may, for example, be atmospheric pressure where the transducer is to be utilized for making gage pressure measurements; otherwise, the pressure may be one of two pressures whose differential is to be measured by the transducer, the other pressure being applied to apertures 11 and 12.

In FIG. 2 it is shown that the two variable capacitors formed with deflecting area 1 are electrically connected in a differential fashion so that the capacity $C_1+$ appears across the lower capacitor while the capacity $C_1-$ appears across the upper capacitor. By connecting the appropriate measuring instrument to those two capacitors, a particular pressure range can advantageously be measured. Since the deflecting area of the diaphragm 1 is larger than the other deflecting areas in this transducer, diaphragm 1 is utilized for the measurement of the lowest pressure range for this particular transducer design.

The next smallest diameter deflecting area is provided by diaphragm 2 which has a similar construction to that of diaphragm 1 and which similarly provides two cavities and hence two capacitors, namely $C_2+$ and $C_2-$ which can be connected to an appropriate measuring instrument for measuring a different range of pressures than would have been measured by diaphragm 1, namely a pressure range extending to a higher pressure differential.

In utilizing the transducer of the figures, there is provided a means for introducing the other one of the fluid pressures involved in the pressure measurement to the apertures 11, 12, 13, and 14. For simplicity of description, this arrangement is not shown in the figures. In one form of the transducer, the fluid pressures to which the apertures 11, 12, 13, and 14 are exposed may also be the pressures to which the surface of the transducer element itself is exposed. Thus, the entire unit as shown in the figures may be encased in a cavity exposed to one of the pressures involved in the measurement, usually the higher pressure, while the lower pressure involved in the measurement may be introduced into the aperture 34 as by a separate pipe (not shown).

In FIG. 3 a side elevation of the transducer is shown with a cross-section exposing the deflecting areas 3 and 4. These areas are shown as that part of the transducer which is utilized for measuring the highest pressure range. Thus, the capacitors formed by these deflecting areas of the silicon and the deposited conducting areas on the glass plates are electrically connected by way of the deposited area 38 and by way of the external connecting wire 40 so that the capacitors on each side of the transducer are connected in parallel to form the combinations identified as capacitors $C_3-_4+$ and $C_3-_4-$. As shown in FIG. 3, aperture 14 has its periphery coated with a metallic conductor so as to make contact between surface 38 and the deposited conducting area 42. On the other side of the diaphragm area 4, electrically conductive area 44 is connected by way of the sealed pin 46 to another electrically conductive area 48 which provides the contact for the connection with the wire 40. A similar structural arrangement is utilized with regard to diaphragm area 3, and as shown in FIG. 3, the manifold 33 provides for the same pressure to be applied on the other side of the diaphragm areas as is also shown and described in FIG. 2.

It will therefore be evident that the differential capacitors formed by the deflecting areas 3 and 4 are connected in parallel so that there is provided for the instrument connected across these capacitors a variable capacity which is capable of measuring a high pressure because of the small areas involved in each cavity defining those deflective areas. By combining in parallel those capacitors, adequate capacity is provided for the measurement. Thus the area of the conductive surfaces 42 and 44 are the same as the conductive areas in the cavities associated with deflecting area 3 and the effective total electrode area of the capacitors formed thereby equal the area of 24 and likewise the area of 28.

As described above, there is shown in the figures a pressure transducer which is capable of measuring three different ranges of pressure as determined by the diameter of the deflecting areas of the diaphragms involved, and the electrical connection of the capacitors formed with those areas. It will be evident to those skilled in the art that other variations involving different diameters and different electrical connections of the capacitors formed can be made to accommodate other multiple ranges as may be desired. Thus, it is possible, for example, to construct a multi-range transducer which may, for example, have three separate pressure ranges such as 21 psi, 46 psi, and 100 psi while still maintaining the required specifications for those ranges. This provision of three different ranges in one unit makes it possible for the supplier providing such devices to carry less stock while maintaining the necessary pressure ranges required in various applications. As shown in the figures, the different ranges are provided by the electrical connections and these, of course, may be switched if this is desired so that the unit may be selectively utilized for different ranges depending on its application.

It has been found by the present invention that it is possible to have a multi-range transducer in which the sizes of the unit, as shown in the figures, may be ¾ of an inch square, whereas the size of the unit without the multi-range feature might normally have been ½ inch square. This small increase in size and the small increase in cost which would accompany the multi-range aspects of the units, makes for a very small increase in price for the multi-range unit as compared with a single range unit, thus providing considerable commercial advantage as well as considerable flexibility.

What is claimed is:

1. A multi-range, variable capacitance pressure transducer, comprising:
   a pair of plates of non-conductive material;
   a diaphragm plate bonded between the plates of said pair, said diaphragm plate having a plurality of conductive deflecting areas of different diameters defined by cavities on opposite sides of said diaphragm plate;
   conducting areas deposited on the plates of said pair opposite the deflecting areas to form capacitors therewith;
   means providing fluid communication to the cavities so that opposing sides of the deflecting areas are exposed to fluid pressures to be measured; and
   means providing electrical connection to the conducting areas and said conductive deflecting areas of said diaphragm plate so that selected combinations of the capacitors formed between said conducting areas and associated conductive deflecting areas are connected to provide the same capacitance and capacitance change for pressure difference measurements of said fluid over different ranges.

2. Apparatus as set forth in claim 1 in which said pair of plates is constructed of borosilicate glass and said diaphragm plate is of silicon.

3. Apparatus as set forth in claims 1 or 2 in which the cavities are the result of the etching of the recesses forming said cavities in the diaphragm plate.

4. Apparatus as set forth in claims 1 or 2 in which said means providing fluid communication includes a manifold providing a common reference pressure to all cavities on one side of said diaphragm plate.

5. A multi-range, variable capacitance pressure transducer, comprising:
   a pair of plates of inorganic electrically insulating material with a plurality of circular electrically conducting surfaces of differing sizes deposited over spaced areas on one surface of each of said plates;
   a diaphragm plate of electrically conductive semiconductor material electrostatically bonded between said pair of plates, said semiconductor material having a plurality of circular recesses of differing sizes in both of its faces in opposing relationship and in registration with said conducting surfaces so as to form with the conducting surfaces of said pair of plates a plurality of capacitors in fluid-tight cavities on opposite sides of diaphragm deflecting areas defined by said recesses;
   means providing fluid communication to the cavities so that the opposite sides of their respective diaphragm deflecting areas are exposed to the pressures to be measured; and
   means providing for electrical connection to the conducting surfaces on each of said pair of plates and said diaphragm plate so that selected combinations of said capacitors can be connected together to provide for pressure measurement over different ranges of pressure difference.

6. A transducer as set forth in claim 5 in which said means providing fluid communication to the cavities includes:
   aperatures through each of said pair of plates connecting to the cavities of said transducer, and
   a manifold for interconnecting the apertures leading to the cavities on one side of said diaphragm plate.

7. A multi-range, variable capacitance pressure transducer, comprising:
   a first plate;
   a second plate bonded to the first plate, said second plate having a plurality of diaphragm deflecting areas of different diameters defined by cavities between said first and second plates;
   opposing electrically conductive areas located on the first plate and the diaphragm deflecting areas of the second plate to form capacitors therebetween;
   means providing fluid communication to the cavities so that the opposite sides of the diaphragm deflecting areas are exposed to a fluid pressure difference to be measured; and means providing electrical connection to the conducting areas so that selected combinations of the capacitors formed by said conducting areas can be connected to provide the same capacitance and capacitance change for pressure difference measurements of said fluid over different ranges.

8. A multi-range, variable capacitance pressure transducer, comprising:

a pair of plates with a plurality of circular electrically conducting surfaces of differing sizes located over spaced areas on one surface of each of said plates;

a diaphragm plate of electrically conductive semiconductor material bonded between said pair of plates, said semiconductor material having a plurality of circular recesses of differing sizes in both of its faces in opposing relationship and in registration with said conducting surfaces so as to form with the conducting surfaces of said pair of plates a plurality of capacitors in fluid-tight cavities on opposite sides of diaphragm deflecting areas defined by said recesses;

means providing fluid communication to the cavities so that the opposite sides of their respective diaphragm deflecting areas are exposed to the pressures to be measured; and means providing for electrical connection to the conducting surfaces on each of said pair of plates and said diaphragm plate so that selected combinations of said capacitors can be connected to provide for pressure measurement over different ranges of pressure difference.

* * * * *